April 14, 1931. E. McKUEN 1,800,555
LUMBER LOADING DEVICE
Filed April 17, 1929
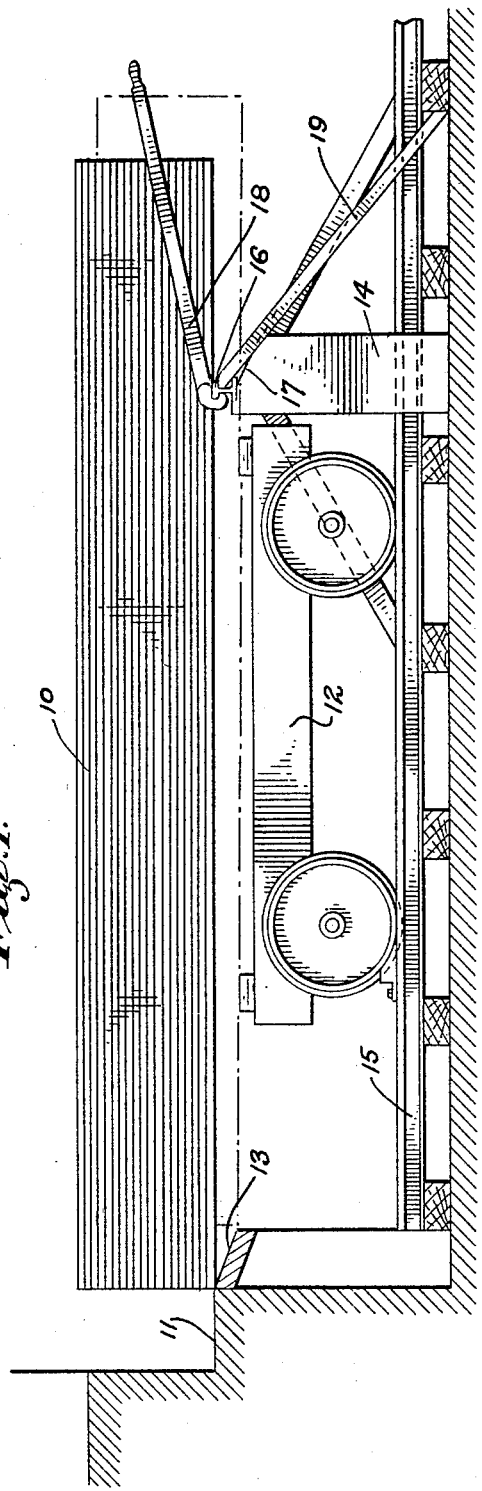
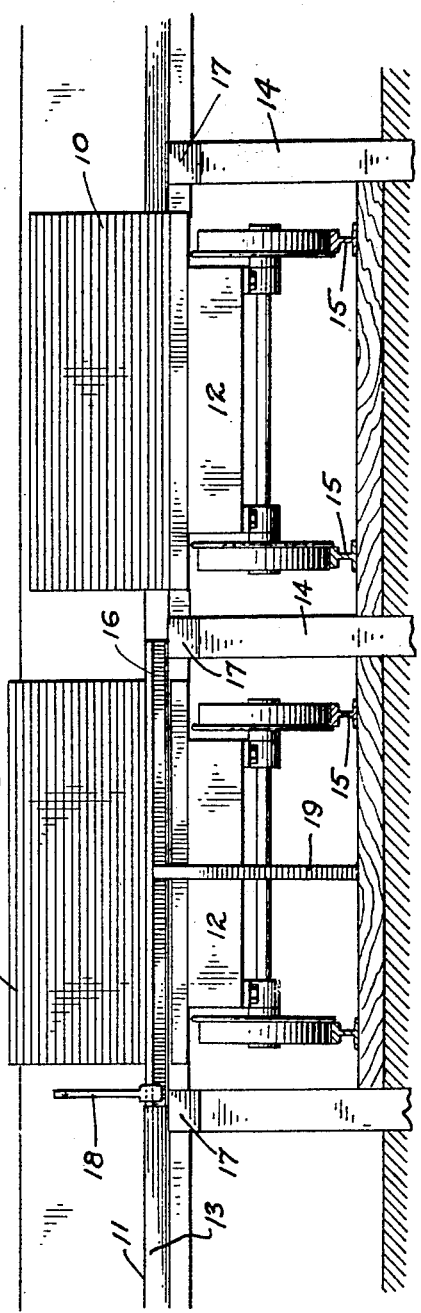
INVENTOR.
Edward McKuen.
BY Townsend, Loftus & Abbett
ATTORNEYS.

Patented Apr. 14, 1931

1,800,555

UNITED STATES PATENT OFFICE

EDWARD McKUEN, OF MADERA, CALIFORNIA

LUMBER-LOADING DEVICE

Application filed April 17, 1929. Serial No. 355,737.

My present invention relates to an improved lumber loading arrangement and more particularly to apparatus for conveniently handling lumber as it is turned out at the saw mill.

An object of my invention is to provide a new and novel arrangement of apparatus for the convenient handling of sawed lumber and the like.

A further object of my invention is to provide apparatus which is particularly well adapted to the handling of lumber as it is turned out at the saw mill.

In the past, various types of collapsible supports have been provided for handling lumber as contemplated by my invention, but these supports have met with very little application as they are in most cases very complicated and expensive, and also because of the fact that they are not as readily adapted to the particular use contemplated.

In carrying out my invention, I propose to provide an arrangement which can be built in as a part of the saw mill loading platform and which will be reliable, cheap, and simple in its operation.

For a better understanding of my invention, reference should be had to the accompanying drawing, wherein I have shown by way of illustration and not of limitation, a preferred embodiment of my invention.

In the drawing—

Fig. 1 is a view in elevation, partially in section, showing my device supporting a load of lumber, and Fig. 2 is a fragmentary view, partially in section, showing two loading stations with the lumber in its unloaded and loaded positions.

In Fig. 1 of the drawing, 10 designates a pile of sawed lumber which is about to be taken away from the saw mill; 11 designates a suitable platform built upon and forming a suitable part of the saw mill; and 12 designates a suitable lumber supporting car such as is commonly used in this art. The platform 11 is shown as having an inclined extension 13 formed as a part thereof, and spaced away from the platform and arranged parallel therewith there is shown a pair of pedestals 14. These pedestals 14 are arranged on opposite sides of a suitable trackway 15 and serve to support a suitable beam 16. In the present instance this beam 16 is shown as comprised of a length of railway rail. The rail 16 is of sufficient length to bridge between the pedestals 14 and serves in co-operation with the platform 11 to form a support for the sawed lumber, the lumber being supported in this manner at a height sufficient to permit an empty car 12 to be placed thereunder. The top of the pedestal 14 is cut away in any suitable fashion as at 17 so that the rail 16 may be dislodged from the pedestals by a simple tipping operation, the tipping operation being carried out by means of a cant hook or wrench 18, in the hands of an operator. With this arrangement it will be seen that when the operator pulls down upon the cant hook 18, he will cause the lumber 10 to move outwardly over the incline 13 upon the platform 11, the rail at the same time sliding down off of the pedestals 14 so as to permit the load of lumber 10 to fall as a whole upon the car 12, the rail 16 during this operation falling down free from the lumber where it can be removed to permit the movement of the car 12 with its load of lumber to any suitable point.

It will also be seen that, with this arrangement, the number of cars required at any particular station will be greatly reduced as the load of lumber can be made up as the car is in use taking a previous load of lumber to an unloading point.

As a safety precaution, I have also shown a stay or strut 19 which may be interposed in any suitable manner between the road bed and the rail 18 to prevent its dislodgment accidentally.

By referring to Fig. 2 of the drawing, it will be seen that with the above arrangement, the trackways may be placed very close together and that only a single pedestal 14 will be required between the trackways, thus making it possible to space the trackways very close together. In this figure of the drawing I have shown only two trackways, but it is to be understood that I contemplate that any number of such trackways may be provided.

While I have shown the preferred form of my invention as now known to me, it is to be understood that various changes may be made in its construction without departing from the spirit of the invention as defined in the appended claims, as for instance, while I have described in the specification and illustrated in the drawings, trackways for the lumber carrying cars, it will be understood that these trackways may be dispensed with and that ordinary unguided cars may be used.

Having thus described my invention, what I claim and desire to secure by Letters Patent is—

1. A loading station comprising a pair of spaced supports, a beam across said supports, a short platform, said supports and beam being spaced from said platform and leaving a space therebetween for a vehicle, and means to remove said beam from said supports while a load is resting on the beam and platform, whereby a load supported on said platform adjacent the edge thereof and on said beam will drop on actuation of said removing means.

2. A loading station comprising a pair of spaced supports, a beam across said supports, a short platform sloping downwardly in the direction of said beam, said supports and beam being spaced from said platform and leaving a space therebetween for a vehicle, and means to remove said beam from said supports, whereby a load supported on said platform adjacent the edge thereof and on said beam will drop on actuation of said removing means.

3. A loading station comprising a platform, supports spaced from each other and from said platform, said supports having each a supporting surface, and a beam having a base of greater width than said supporting surfaces, means for tilting said beam to drop a load supported on said platform adjacent the edge thereof and on said beam.

4. A loading station comprising a platform, supports spaced from each other and from said platform, said supports having each a supporting surface, a beam having a base of greater width than said supporting surfaces, means to prevent tilting of said beam, and means to tilt said beam, whereby it may be tilted therefrom to drop a load supported on said platform adjacent the edge thereof and on said beam.

5. A loading station comprising a platform, supports spaced from each other and from said platform, said supports having each a supporting surface, a beam adapted to rest upon said supporting surfaces, a removable brace to prevent tilting of said beam, and a removable lever to tilt said beam, whereby it may be tilted therefrom to drop a load supported on said platform adjacent the edge thereof and on said beam.

6. A loading station comprising a platform having a sloping end, supports spaced from each other and from said platform, said supports having each a supporting surface, and a beam having a base of greater width than said supporting surfaces and a height at least substantially as great as the width of the base thereof, means for tilting said beam from said supports to drop a load supported on said platform adjacent the edge thereof and on said beam.

7. A loading station comprising a platform having a sloping end, supports spaced from each other and from said platform, said supports having each a supporting surface, a beam having a base of greater width than said supporting surfaces and a height at least substantially as great as the width of the base thereof, means to prevent tilting of said beam, and means to tilt said beam, whereby said beam may be tilted from said supports to drop a load supported on said platform adjacent the edge thereof and on said beam.

8. A loading station comprising a platform having a sloping end, supports spaced from each other and from said platform, said supports having each a supporting surface, a beam having a base of greater width than said supporting surfaces and a height at least substantially as great as the width of the base thereof, a removable brace to prevent tilting of said beam, and a removable lever to tilt said beam, whereby said beam may be tilted from said supports to drop a load supported on said platform adjacent the edge thereof and on said beam.

9. A loading station comprising a platform having a sloping end, supports spaced therefrom and from each other, said supports each having a supporting surface, a beam having a base of greater width than said supporting surfaces and a height at least substantially as great as the width of the base thereof and a rounded head, abutments on said supports to position said beam, the center of said beam being close to the edges of said surfaces, a removable brace to prevent tilting of said beam, and a cant hook to tilt said beam.

10. A loading station comprising a platform having a sloping end, supports spaced therefrom and from each other, said supports each having a supporting surface, abutments defining said surfaces, a railroad rail on said supporting surfaces and against said abutments, the center of said rail being close to the edges of said surfaces, a removable brace, the end of which is in the rail groove, and a cant hook to tilt said rail to drop a load supported at one end on said rail and at the other end on said platform.

EDWARD McKUEN.